United States Patent
Zhai et al.

(10) Patent No.: US 8,079,718 B1
(45) Date of Patent: Dec. 20, 2011

(54) EMBEDDABLE 2-D PROJECTION NANO ENGINE FOR PERSONAL PROJECTOR

(75) Inventors: Jinhui Zhai, Oldsmar, FL (US); Israel J. Morejon, Tampa, FL (US); Patrick J. Verdon, Palm Harbor, FL (US); Lin Li, St. Petersburg, FL (US); Robert J. Pantalone, Largo, FL (US); Evan O'Sullivan, Safety Harbor, FL (US)

(73) Assignee: Jabil Circuit, Inc., St. Petersburg, FL (US)

( * ) Notice: Subject to any disclaimer, the term of this patent is extended or adjusted under 35 U.S.C. 154(b) by 803 days.

(21) Appl. No.: 12/052,386

(22) Filed: Mar. 20, 2008

Related U.S. Application Data

(60) Provisional application No. 60/895,927, filed on Mar. 20, 2007, provisional application No. 60/942,236, filed on Jun. 6, 2007.

(51) Int. Cl.
*G03B 21/26* (2006.01)
*G02F 1/1333* (2006.01)

(52) U.S. Cl. ............................................ 353/94; 349/86

(58) Field of Classification Search ............... 353/94, 353/30, 31; 359/15, 24; 349/74, 86, 196
See application file for complete search history.

(56) References Cited

U.S. PATENT DOCUMENTS

| | | | | |
|---|---|---|---|---|
| 6,115,152 A | * | 9/2000 | Popovich et al. | 359/15 |
| 6,139,156 A | * | 10/2000 | Okamori et al. | 353/98 |
| 6,778,228 B2 | * | 8/2004 | Murakami et al. | 349/5 |
| 2008/0165401 A1 | * | 7/2008 | Kasazumi | 359/196 |

FOREIGN PATENT DOCUMENTS

WO    WO 2006090681 A1 * 8/2006

* cited by examiner

*Primary Examiner* — William C Dowling
*Assistant Examiner* — Ryan Howard
(74) *Attorney, Agent, or Firm* — Ronald E. Smith; Smith & Hopen, P.A.

(57) ABSTRACT

A projector has a transmissive spatial light modulator backlit by a collimated illuminator that includes a light source that outputs red, green, blue (RGB) light, and a combiner disposed in light-receiving relation to the light source for mixing or combining the RGB light. The combiner has cavity features associated therewith for outputting collimated light, where such light preferably has a divergent cone angle less than plus or minus fifteen degrees (+/−15°).

13 Claims, 9 Drawing Sheets

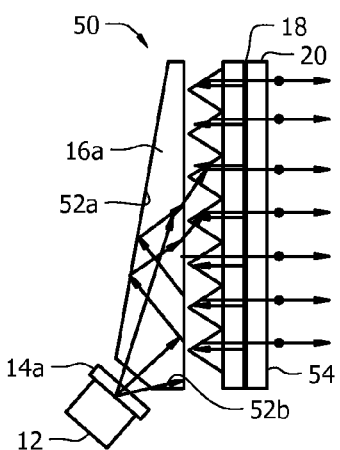
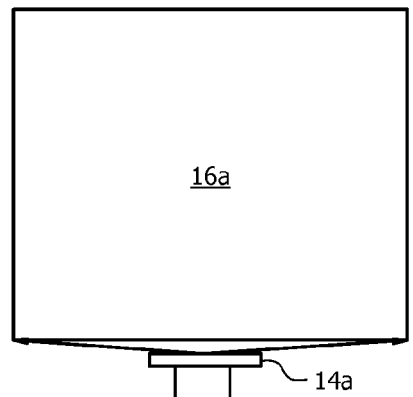
*FIG. 5A*
*FIG. 5B*
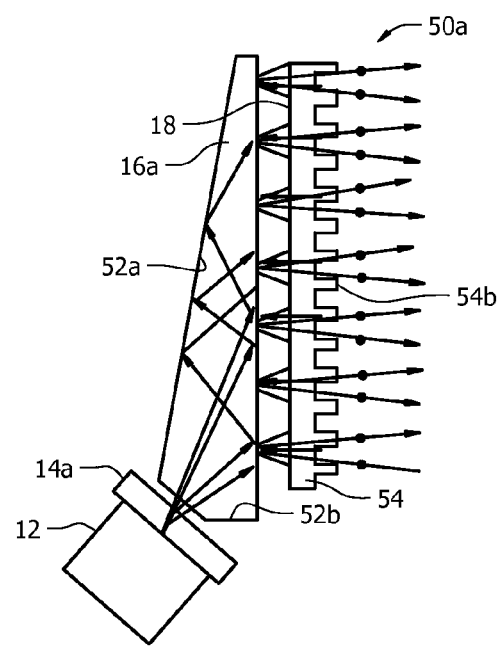
*FIG. 6*

EMBEDDABLE 2-D PROJECTION NANO ENGINE FOR PERSONAL PROJECTOR

CROSS-REFERENCE TO RELATED DISCLOSURES

This disclosure is a continuation of U.S. provisional patent application No. 60/895,923, filed Mar. 20, 2007 by the same inventors and entitled "Embeddable 2-D Projector Nano Laser Engine For Personal Projector," No. 60/895,927, filed Mar. 20, 2007 by the same inventors and entitled "Ultra-compact 2-D Projection Nano Laser Engine For Personal Projector," No. 60/943,332 filed Jun. 12, 2007 by the same inventors and entitled "Embeddable 2-D Projection Nano LED Engine For Mobile Projector." Those disclosures are hereby incorporated by reference in their respective entireties into this disclosure.

FIELD OF THE INVENTION

The invention relates, generally, to an ultra-compact 2-D projection nano engine that can be embedded into a personal projector. More particularly, this invention relates to a thin profile collimated backlight source to illuminate a transmissive microdisplay in a miniature projector.

DESCRIPTION OF THE PRIOR ART

Known laser illuminated micro-mirror scanning displays have are subject to laser speckle issues, laser safety issues arising from a high power flying spot, and the need for a high frequency large scan angle micro-mirror.

Laser or LED illuminated panel based micro projection devices have a larger size and weight engine, a complex optical system, provide low focus depth of output image, exhibit low efficiency, low brightness and "speckle" phenomena for laser projection.

Similar shortcomings are inherent in laser illuminated panel based holographic projection. For example, such projections require complex illumination optics, are subject to the laser speckle issue, need real time video signal converting "hologram chip." They exhibit low efficiency, low brightness, bad image quality and can't be used for progressive scanning of ASLM panels.

Thus there is a need for a small, mobile, personal projector that is not subject to laser-related speckling phenomena, that operates on low power so as to be safe to the human eye, and which does not require use of a high frequency large scan angle micro-mirror.

A further need exists for a personal projector that is smaller and lighter-in-weight than known projectors, that has a simple optical system, provides a high focus depth of the output image, operates with high efficiency, and high brightness.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for an apparatus and method for an embeddable 2-D projection nano engine for a personal projector is now met by a new, useful, and non-obvious invention.

The inventive structure has an ultra-small size and is light-in-weight. It consumes little power yet has sufficient brightness for personal projector applications such as handheld appliances and mobile phones. The illumination module is thin and is eye safe at high lumen output and produces a speckle-free beam for high performance video/image projection.

A laser-based embodiment of the invention discloses a multi-layer switchable liquid crystal device to combine RGB lasers into collinear de-speckled white light. A light illumination cavity that emits collimated light and angle management films are used for a thin illumination module. A beam diverging flat optic component diverges a laser beam and directs it into the light illumination cavity. Only a laser beam that has an internal incident angle at the wedge plate top surface less than the total reflection critical angle inside the wedge plate is emitted from the optical wedge plate. The emitted beam passes through the angle management films and illuminates a transmissive spatial light modulation means which preferably takes the form of an advanced spatial light modulation (ASLM) panel. Lasers with different input angles will emit from different optical wedge plate areas. Panel illumination uniformity is controlled by optimizing the design of the light distribution at different divergent angles.

An RGB LED embodiment of the invention does not require beam spreading or diverging as in the case of a laser beam. A light mixing cavity in light-receiving relation to the light source is required, however, to mix the colors of the light in a short distance. The light mixing cavity has highly light-reflective internal surfaces and in some embodiments has a straight neck at the input of the light mixing cavity. Light emitted from the light mixing cavity enters into a light illumination cavity for collimation, just as in the laser-based embodiment. However, it first travels through a micro-optics collimation plate.

Both the RGB LED-based and laser-based embodiments of the invention are ultra-thin and light-in-weight, highly efficient, consume little power and are capable of being embedded into mobile devices with significantly reduced speckle phenomena. The novel nano-projector light engine may also include re-configurable magnifying optics for always-in-focus image output.

More particularly, the novel small, light-in-weight, mobile projector includes a source of light, an optical combiner having a thin profile disposed in light-receiving relation to the source of light, and a light illumination cavity having a thin profile disposed in light-receiving relation to the optical combiner. The light illumination cavity has a front surface through which collimated light is emitted. A transmissive spatial light modulation means has a thin profile and is disposed in light-receiving relation to the light illumination cavity so that light from the source of light is mixed by the optical combiner, collimated by a micro-optic collimation plate and the light illumination cavity, and illuminates the transmissive spatial light modulation means in a thin space.

The novel projector further includes magnifying optics disposed in parallel relation to the transmissive spatial light modulation panel so that a 2-D projection is formed on a preselected surface disposed substantially parallel to the transmissive spatial light modulation panel.

The source of light may be an RGB LED set or an RGB laser set.

The RGB LED set is positioned in light-emitting relation to a preselected edge of the thin light illumination cavity, in perpendicular relation to a longitudinal axis of symmetry of the thin light illumination cavity and the thin transmissive spatial light modulation means.

The collimated light emitted from the front surface has a divergent cone angle less than plus or minus fifteen degrees (+/−15°).

The novel structure further includes a micro-optic light collimation lens and a light mixing cavity disposed between the source of light and the light collimation lens. The micro-optic light collimation lens is disposed between the light mixing cavity and the light illumination cavity. An LCD panel is disposed in light-receiving, parallel relation to the light illumination cavity so that the LCD panel is illuminated by light emitted through said front surface so that light from said source of light is mixed in the light mixing cavity, collimated by the light collimation lens, and illuminates the LCD panel.

A light extraction plate is positioned on the front surface of the light illumination cavity and a reflective polarizer is disposed between said front surface and the LCD panel so that light is extracted from the light illumination cavity by the light extraction plate, and only light having one polarization component travels through the reflective polarizer to illuminate the LCD panel. The light extraction plate may take the form of a light extraction prism film and the micro-optic light collimation lens may be provided in the form of a Fresnel lens.

In one embodiment, the light mixing cavity has arcuate side walls and is also configured to have a light collimation function. Interior walls of the light mixing cavity and the light illumination cavity have highly light-reflective surfaces.

In another embodiment, the light mixing cavity has straight, tapered side walls and is further configured to provide a light collimation function. Interior walls of the light mixing cavity and the light illumination cavity have highly light-reflective surfaces. The light mixing cavity may be hollow and air-filled and the light illumination cavity may have a solid construction. The light illumination cavity may include a plurality of microprisms on said front surface of solid construction and a birefringement material preferably fills the microprisms so that the microprisms are configured to extract collimated light from said front surface and so that only S-polarization light is extracted from said front surface.

In another embodiment, the light mixing cavity has an irregular shape and the RGB LED set is mounted on a sidewall of the light mixing cavity. The interior walls of the light mixing cavity and the light illumination cavity are highly light-reflective.

The light mixing cavity may also have an arcuate top wall and a flat bottom wall. In that embodiment, the RGB LED set is mounted on the flat bottom wall of the light mixing cavity. As in the other embodiments, the interior walls of the light mixing cavity and the light illumination cavity have highly light-reflective surfaces.

The light mixing cavity of another embodiment has a straight neck centered on a longitudinal axis of symmetry of the light illumination cavity and the RGB LED set is centered within the straight neck. The light mixing cavity includes arcuate side walls that interconnect the straight neck and the light illumination cavity.

In a variation of the straight neck embodiment, the light mixing cavity includes straight, tapered side walls that interconnect the straight neck and the light illumination cavity.

The light mixing cavity and the light illumination cavity may also be combined into a single two dimensional optical combiner so that light from said source of light is mixed and collimated by said two dimensional optical combiner, and further collimated by the light collimation lens, and illuminates the transmissive spatial light modulation means in a thin space. The two dimensional optical combiner may have a straight neck centered on a longitudinal axis of symmetry of the transmissive spatial light modulation. The RGB LED set is centered within the straight neck, and the two dimensional optical combiner may include arcuate or straight, tapered side walls that interconnect the straight neck and the light illumination cavity.

In the embodiment where the source of light is an RGB laser set, the light illumination cavity is adapted to emit only light having an internal incident angle at said front surface of the light illumination cavity that is less than a total reflection critical angle inside the light illumination cavity.

The optical combiner of this RGB laser set embodiment includes a plurality of switchable liquid crystal layers disposed in abutting relation to the source of light so that light emitted from said source of light is constrained to pass through the plurality of switchable liquid crystal layers.

The optical combiner includes at least two switchable liquid crystal layers disposed in light transmitting relation to one another. A polymer dispersion liquid crystal grating that provides phase modulation and de-speckling for light traveling therethrough is preferably disposed in overlying relation to a preselected layer of said at least two switchable liquid crystal layers.

A light management film is positioned between the light illumination cavity and said transmissive spatial light modulation means. The light management film provides uniform light distribution along a vertical direction of the transmissive spatial light modulation means.

A beam diverging flat optic component is provided for diverging the laser beam in two directions before entering the light illumination cavity. The beam diverging flat optic component may take the form of a diverging diffuser so that the laser beam is diverged at a wide angle with uniform intensity distribution along the horizontal direction of the transmissive spatial light modulation means. A total internal reflection lens is provided for collimating the laser beam at an entrance of the light illumination cavity before entering the light illumination cavity. Interior surfaces of the light illumination means are highly light-reflective to reflect light and avoid light leakage. The laser beam is incident inside the light illumination cavity on a front exiting surface thereof at a predetermined angle. More specifically, a laser beam having an internal incident angle less than a total reflected critical angle is emitted from said front exiting surface to illuminate the transmissive spatial light modulation means.

A nano-wire grid polarizer sheet may be provided for transmitting a high ratio polarized beam and reflecting back a crossed polarization light for polarization recycling. The polarization recycling includes reflection of de-polarized light back to the angle management film and the light illumination cavity for recycling. The angle management film may be integrated into the nano wire-grid polarizer. The nano wire-grid polarizer sheet may have a nano-scale grating feature on a first side thereof for emitting a high ratio polarized beam and reflecting back de-polarized light for polarization recycling and said nano wire-grid polarizer sheet may have a prism feature on a second side thereof for turning light emitted by the light illumination cavity into collimated light with small cone angles. The nano wire-grid polarizer sheet may take the form of a multi-functional transmissive right angle-reflective polarizer film.

A plurality of micro-grooves having a predetermined shape and forming a predetermined pattern is embedded into said front exit surface of the light illumination cavity. A high refractive index material fills the micro-grooves to extract light. The extracted light has an angular distribution controlled by the predetermined shape of the micro-grooves, a wedge angle and a difference of refractive index between the material of which the light illumination cavity is made and the groove-filling material. The micro-groove pattern has a distribution density adapted to provide uniform light extraction. The microgrooves are filled with a birefringent material so that polarized light is extracted by the micro-grooves.

An important object of this invention is to provide a thin illumination module for an ultra-compact nano-projector light engine.

A closely related object is to provide such an engine that can be embedded into any personal projector.

Another object is to provide an engine having no laser safety issues with sufficient brightness for 12-35" projection image.

Still another object is to provide an engine having significantly reduced speckle phenomena.

Further objects include providing an engine that exhibits the qualities of high efficiency, high brightness, low power consumption, scalable resolution and better image quality, large color gamut and long operating life.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 5A diagrammatically depicts a nano light engine with wedge optics and polarization recycling in side elevation;

FIG. 5B is a front elevational view of the apparatus of FIG. 5A;

FIG. 6 diagrammatically depicts a nano light engine with wedge optics and an integrated wire-grid polarizer;

DETAILED DESCRIPTION OF THE PREFERRED EMBODIMENT

Figure 1:
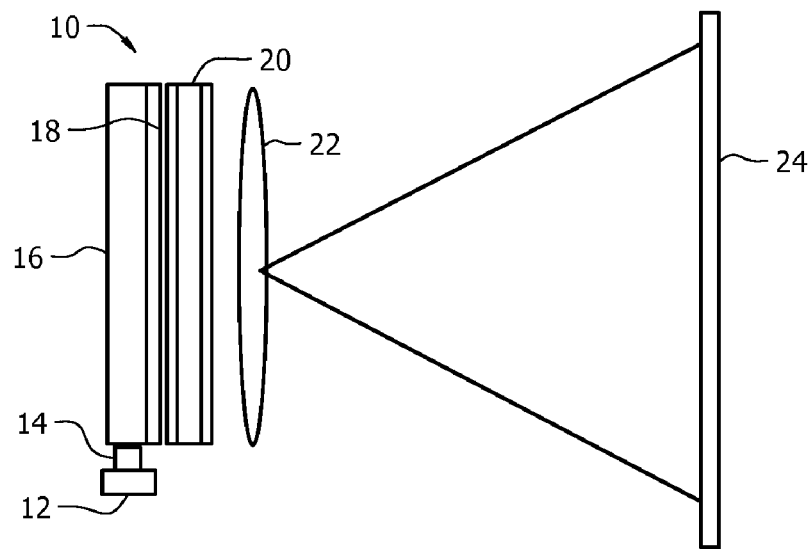
FIG. 1 diagrammatically depicts a personal projector with 2-D projection wedge optics based nano laser engine.

FIG. 1 depicts a novel ultra-compact 2-D projection nano-laser engine, denoted 10 as a whole. It includes a switchable liquid crystal and a wedge optics illumination module for personal projectors.

More particularly, it includes laser sets 12, a multi-layer switchable liquid crystal device 14 for red-green-blue (RGB) polarized laser beam combination and de-speckling, optical wedge plate 16, and light management film 18 for a thin illumination module. It further includes a transmissive spatial light modulation means which may take the form of an advanced spatial light modulation (ASLM) module 20 for high speed digital image data processing, and magnifying optics 22 for projecting an image onto a 12-35" screen plane 24. However, an ASLM is not critical; the inventive structure will function with any light transmissive spatial light modulation means and all reference herein to an ASLM includes any light transmissive spatial light modulation means.

Moreover, a laser beam is naturally collimated so part of the purpose of the multi-layer switchable liquid crystal device 14 and optical wedge plate 16 is to diverge said highly collimated beam so that backlighting for an LCD panel is provided by laser light that has been spread out, thereby avoiding points of light and the concomitant speckling problems that accompany such points. When the beam is diverged, it is important to mix the colors therein; optical wedge plate 16 therefore has highly reflective internal surfaces for that purpose.

If an RGB LED set is used instead of a laser set, as disclosed hereinafter in connection with FIG. 10 and figures subsequent thereto, the light is naturally diffuse so switchable liquid crystal device 14 is not needed. However, color mixing in a short distance is still required. Thus, a color mixing chamber having highly reflective internal surfaces is used in the RGB LED sets version of the invention.

For this reason, the term "optical combiner" is generically used herein to include the beam-spreading and color mixing function of the switchable liquid crystal device 14 and optical wedge plate 16 of the laser embodiments as well as the color mixing function of the chamber having highly reflective internal serves in the RGB LED sets embodiment.

A beam diverging flat optic component, not depicted, is needed to expand the laser beam in the horizontal direction and to diverge the laser beam in the vertical direction before entering optical wedge plate 16. A reconfigurable magnifying optics, not depicted, may be needed for auto focusing for an always-in-focus image at projected plane 24.

Figure 2:
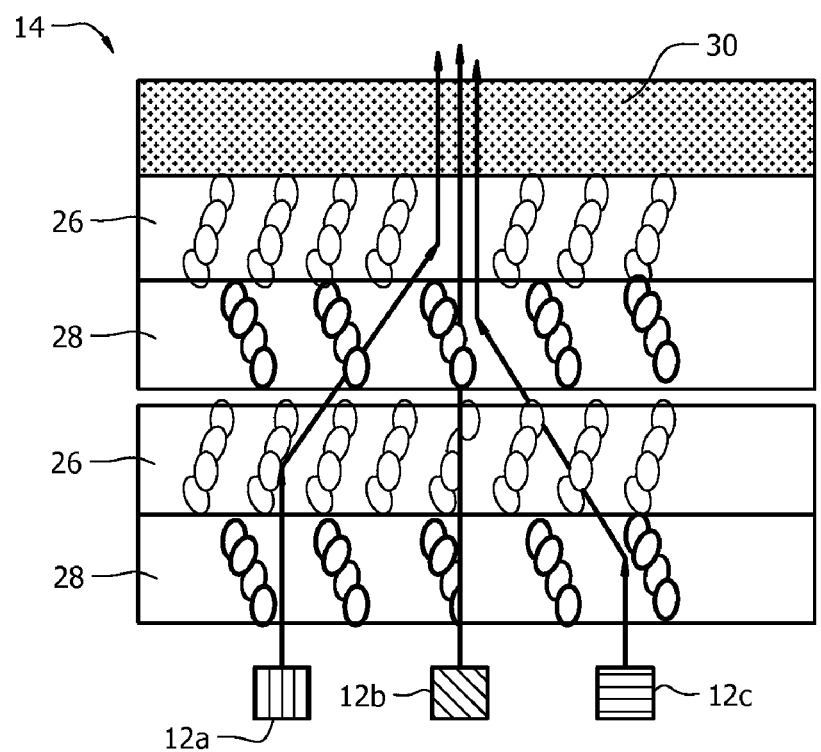
FIG. 2 diagrammatically depicts four (4) switchable liquid crystal layers for RGB lasers combination.

FIG. 2 depicts multi-layer switchable liquid crystal device 14 for RGB laser beam combination and de-speckling Beam combiner 14 uses switchable liquid crystal layers for laser beam steering and RGB laser combination. According to one aspect of the present invention, beam combiner 14 includes multi-layer electrical controllable polymer dispersion liquid crystal (PDLC) grating. In the example of FIG. 2, red-in-color switchable liquid crystal layers are denoted 26, blue-in-color switchable liquid crystal layers are denoted 28, and an electrically controllable phase-only modulation liquid crystal device 30 is used for laser beam de-speckling The red light laser is denoted 12*a*, the green light laser is denoted 12*b*, and the blue light laser is denoted 12*c*.

There is a gap between a first red-blue layer 26-28 and a second red-blue layer 26-28 as depicted in FIG. 2. There is no gap between the second red-blue layer 26-28 and phase-only modulation liquid crystal device 30.

Figure 3:
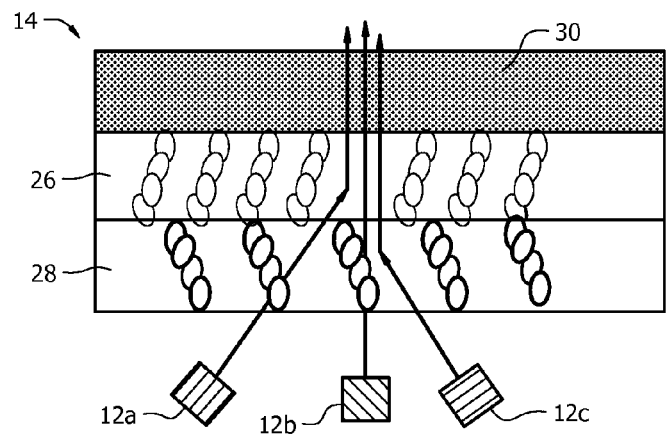
FIG. 3 diagrammatically depicts two switchable liquid crystal layers for RGB laser combination.

FIG. 3 depicts another configuration using switchable liquid crystal devices 14 for RGB laser beam combination. Blue and red lasers 12*a*, 12*c* have an incident angle as depicted relative to blue and red switchable PDLC layers 26, 28 for RGB light combination. Electrically controllable phase modulation liquid crystal device 30 may also be used in this configuration for laser beam de-speckling as in the FIG. 2 embodiment.

Figure 4:
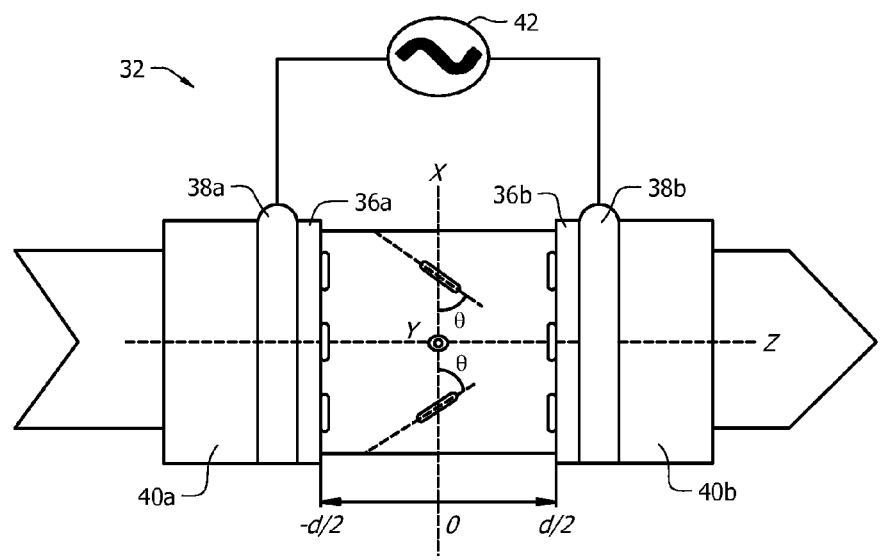
FIG. 4 diagrammatically depicts a phase modulation liquid crystal for laser beam de-speckling.

A high speed liquid crystal phase-only modulation de-speckle device 32, depicted in FIG. 4, uses a layer of liquid crystal cells 34 as a phase shifter. Layer 34 is sandwiched between alignment layers 36*a*, 36*b* that overlie confronting sides of transparent electrodes 38*a*, 38*b*. Glass substrates 40*a*, 40*b* overlie respective exterior surfaces of said transparent electrodes 38*a*, 38*b*. Voltage is applied to transparent electrodes 38*a*, 38*b* by voltage source 42.

The optical axis of liquid crystal cells 34 is parallel to the average direction of the quiescent molecular orientation. With no applied voltage from source 42, liquid crystal molecules 34 align with an average orientation parallel to glass substrates 40*a*, 40*b*. By supplying a relatively low voltage from source 42, liquid crystal molecules 34 are re-oriented and the effective refractive index of the liquid crystal is changed. For a linearly polarized beam 44 propagating parallel to the extraordinary axis, the phase shift φ is proportional to the thickness of liquid crystal layer 34, described as follows:

$$\varphi = \frac{2\pi}{\lambda} \cdot \Delta n \cdot d$$

Where Δn is the change in birefringence of the material, d is the thickness of liquid crystal layer 34, and λ is the free space wavelength. If d is constant, phase shift φ is proportional to Δn which changes with the applied voltage. By applying a random voltage, the beam phase shift is random to de-speckle laser beam 44 with no effect on its polarization state.

High speed phase shift can be achieved by dual frequency liquid crystal or polymer-dispersed liquid crystal (PDLC).

FIG. 5A depicts another embodiment of a nano light engine illumination module 50 with wedge optics. Laser set 12 generates a laser beam that is diverged in two directions as indicated in FIG. 5B, by a beam diverging flat optic component 14*a* before entering optical wedge plate window 16*a*. As an aspect of the present invention, diverging diffuser 14*a* may be used as a beam diverging flat optic component. The laser beam is diverged at a wide angle as indicated in FIG. 5B with uniform intensity distribution along the horizontal direction of ASLM panel 20, and then is collimated at the input surface of optical wedge plate 16*a* before entering said optical wedge plate. At its crossed direction to this horizontal direction, a laser beam is slightly diverged and enters optical wedge plate 16*a* with different incident angles. The angle of divergence and the angular intensity distribution at this cross direction will be an optimized design together with the optical wedge design and angle management films 18 to achieve uniform light distribution along the vertical direction of ASLM panel 20. Wedge plate 16*a* has a high reflective coating/sheet 52*a*, 52*b* at both ends and the back surface of wedge plate 16*a* to reflect the light and avoid light leakage. Inside optical wedge 16*a*, the laser beam is incident on the front exiting surface at a certain angle. Only the laser beam that has an internal incident angle less than the total reflected critical angle will be emitted from this front exiting surface of wedge plate 16*a* and illuminate ASLM panel 20, after angle turning film 18.

A laser beam having an incident angle larger than the total reflected critical angle will have one or multiple reflections off of wedge plate back surface 52*a* and emit from the front exiting surface as soon as its incident angle is less than the total reflection incident angle. Angle management films 18 are needed to turn the direction of the emitting light from optical wedge 16*a* and control its divergent angle less than +/−twelve degrees (12°) to be incident on ASLM 20.

A polarization recycling may be needed to reflect the de-polarized light back to angle management films 18 and wedge 16*a* for recycling. As an aspect of this invention, a nano-wire grid polarizer 54 or 3M DBEF sheet may be needed to transmit a high ratio polarized beam and reflect back a crossed polarization light for polarization recycling.

Angle turning film 18 could be integrated into the nano wire-grid polarizer 54 as depicted in assembly 50*a* FIG. 6. The integrated nano wire-grid polarizer sheet 54 has a nano-scale grating feature at the front side for high ratio polarized beam output and reflecting back the de-polarized light for polarization recycling. Back side 54*b* of the integrated nano wire-grid polarizer has prism features for turning the light exiting from optical wedge 16 into a collimation light with small cone angles. 3M multi-functional transmissive right angle-reflective polarizer film may be used as this multi-functional sheet.

Figure 7:
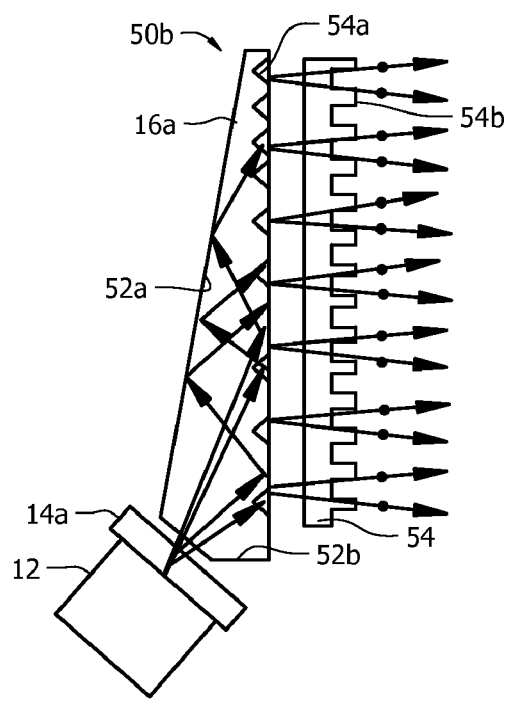
FIG. 7 diagrammatically depicts a variation of the FIG. 6 embodiment.

FIG. 7 depicts another embodiment of a compact light illumination module 50*b* that integrates the angle turning features into optical wedge 16*a*. Micro-groove pattern 54*a* is embedded into the exit surface of optical wedge 16*a*, which is filled with high refractive index material to extract the light. The angular distribution of the extracted light is controlled by the shape of micro-grooves 54*a*, the wedge angle and the difference of refractive index between the optical wedge material and groove-filling material. The distribution density of the micro-groove pattern is properly designed to get uniform light extraction. A reflective polarizer may be needed on top of optical wedge 16*a* to output high ratio polarized light and reflect back de-polarized light for polarization recycling. This reflective polarizer can be eliminated if micro-grooves 54*a* are filed with birefringent material so the polarized light will be extracted by birefringent grooves.

If the advanced spatial light modulation (ALSM) panel 20 is a polarization non-sensitive transmissive SLM, then no polarized light is required from the illumination module which simplifies the illumination module. It is not necessary to maintain the high ratio polarization after the switchable liquid crystal laser combiner. The polarization recycling film is also not needed.

Figure 8:
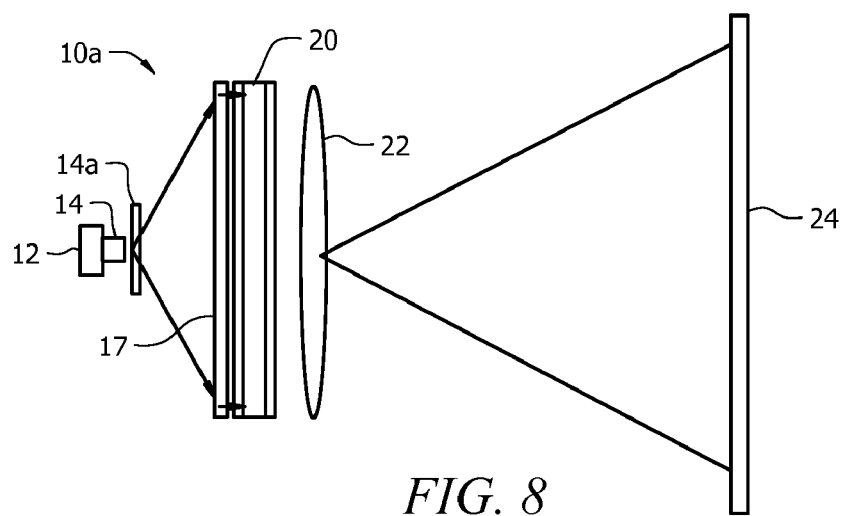
FIG. 8 diagrammatically depicts an embodiment similar to that of FIG. 1 but with the laser set being centered on a longitudinal axis of symmetry of the engine.

FIG. 8 depicts another embodiment of the ultra-compact 2-D projection nano laser engine 10a for a personal projector. It includes laser sets 12 that are mounted on a longitudinal axis of symmetry of the device instead of the edge mounting of the FIG. 1 embodiment. Multi-layer switchable liquid crystal device 14 for RGB laser combination and de-speckling is mounted in abutting relation to laser sets 12 just as in the FIG. 1 embodiment. Beam diverging flat optics 14a, as in the embodiments of FIGS. 5 and 6, is provided for uniformly diverging and shaping the laser beam into ASLM panel 20 size and aspect ratio.

Beam collimation flat optics 17 is positioned between beam diverging flat optics 14a and ASLM module 20 for collimating the laser beam and incident light onto ASLM panel 20. The beam diverging/collimation flat optics is a state-of-the-art diffractive/refractive hybrid thin module used to produce an expanded, de-speckled, high ratio polarization uniform laser beam for ASLM illumination. The beam diverging and collimation modules may be integrated into a single molded flat optics module.

Figure 9:
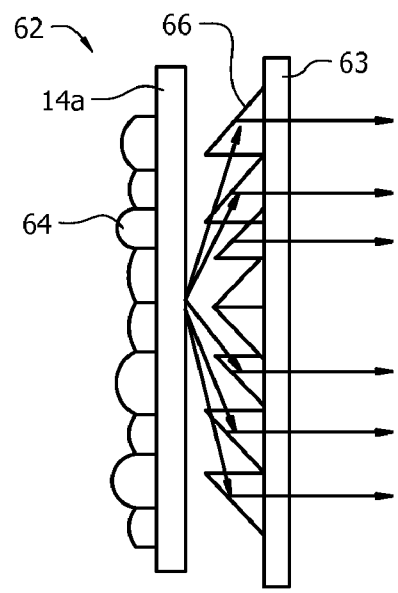
FIG. 9 diagrammatically depicts in side elevation an embodiment of a flat optics module for laser beam expanding and collimation.

FIG. 9 depicts an embodiment of a flat optics module 62 for laser beam expanding and collimation. The beam diverging flat optics 14a diverges and shapes the laser beam to panel size and aspect ratio for uniform illumination of an ASLM panel 20. The collimation flat optic plate 63 then collimates the laser beam incident to the ASLM panel. Beam diverging and collimation module 62 maintains the high ratio polarization beam for ASLM illumination. As one aspect of the present invention, a specific designed holographic or microlens diffuser 64 may be used to diverge the laser beam into wide diverging angles with uniform intensity distribution and predetermined cross section at very short distance for a thin illumination module. As one aspect of the present invention, a Fresnel type flat optics and TIR lens 66 may be used for the collimation flat optics. Beam diverging and collimation flat optics 62 may be integrated into one single molded module.

Figure 10:
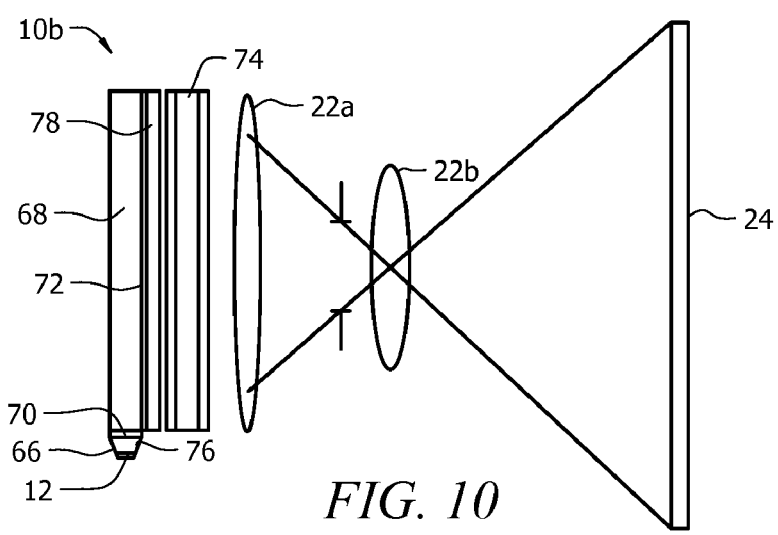
FIG. 10 diagrammatically depicts a personal projector embodiment with an RGB LED light source instead of the laser sets of the first-depicted embodiments.

FIG. 10 depicts another embodiment 10b of the ultra-compact 2-D projection nano-LED engine based on an ultra-thin illumination cavity for personal projectors. It includes a light mixing cavity 66 for RGB LED beam mixing and large light divergent angle reduction. Ultra-thin illumination cavity 68 includes micro-optic collimation plate 70 at its input window and light extraction plate 72 at the exit or front window of said illumination cavity 68 for LED beam combination, homogenization, collimation, shaping and extraction.

Transmissive LCD device 74 is provided for high speed digital image data processing, and micro-projection optics 22a, 22b are provided for projecting the image onto a 12-35☐ screen plane 24. RGB LED colors are mixed in the air space of light mixing cavity 66. Said light mixing cavity 66 is preferably tapered and has highly reflective walls to redirect the large divergent angle light to mix and collimate the RGB colors. Light mixing cavity 66 may have other reflective curved shapes for collimating the combined RGB LED light.

Multi-chip LED device 12 is positioned inside light mixing cavity 66 to avoid light leakage and a highly reflective film 76 is positioned at LED chip 12 surface in a non-emitting area to recycle the light.

Ultra-thin illumination cavity 68 includes a highly reflective cavity, micro-optic collimation plate 70 as its input window and light extraction plate 72 as a light exit window as aforesaid. Light extraction plate 72 can only extract the RGB combined light within a specific cone angle. The extracted light is within a specific design divergent angle to match the F/# of projection lens 22a, 22b to illuminate LCD panel 74. Reflective polarizer 78 may be needed to transmit P-polarization light and reflect S-polarization light back to illumination cavity 68 for polarization recycling.

Figure 11A:
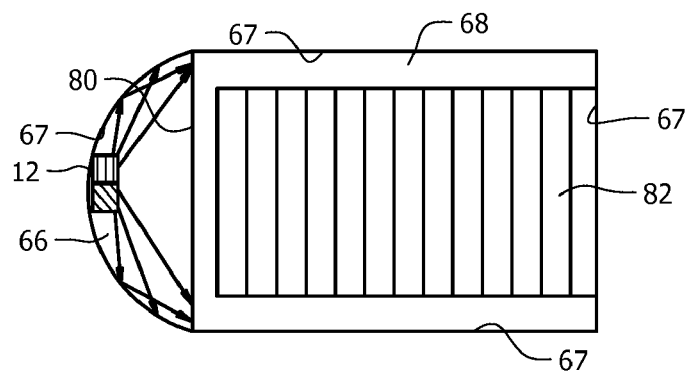
FIG. 11A is a diagrammatic top plan view of the color mixing and illumination cavities of the FIG. 10 embodiment.
Figure 11B:
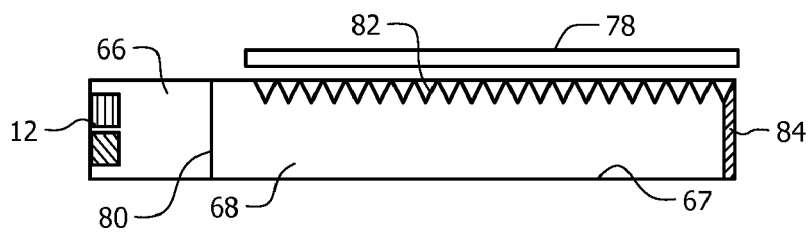
FIG. 11B is a diagrammatic side elevational view of the color mixing and illumination cavities of the FIG. 10 embodiment.

FIGS. 11A and 11B depict one embodiment of RGB LED colors mixing and illumination cavity 68. It includes two air cavities 66 and 68, one light collimation fresnel lens 80 positioned between light mixing cavity 66 and light illumination cavity 68 and one light extraction prism film 82 to combine, homogenize, collimate and shape the RGB LED colors light. Quarter-wave plate 84 may be needed inside illumination cavity 68 to quickly convert S-polarization into P-polarization for polarized light extraction after light hits refractive polarizer 78. Air cavities 66 and 68 have highly reflective interior surfaces, collectively denoted 67.

Figure 12:
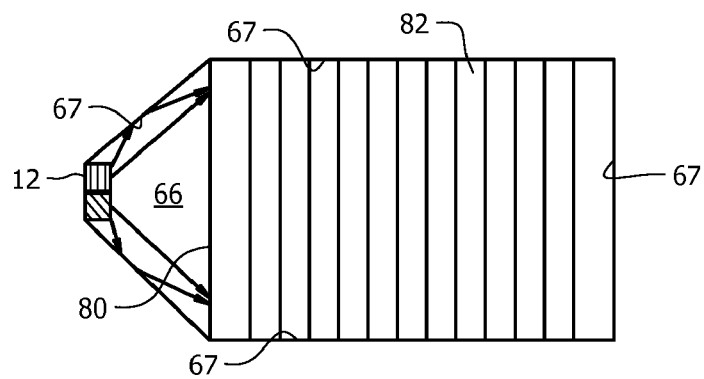
FIG. 12 is a diagrammatic top plan view of an alternative embodiment of the structures depicted in FIGS. 11A and 11B.

FIG. 12 depicts another embodiment of an RGB LED colors mixing and illumination cavity 68. Light mixing cavity 66 is a simple hollow taper instead of the rounded configuration of the embodiment of FIGS. 11A and 11B. The light collimation Fresnel lens 80 and light extraction prism structure 82 are optimally designed for effectively collimating the LED light to illuminate LCD panel 74.

Figure 13:
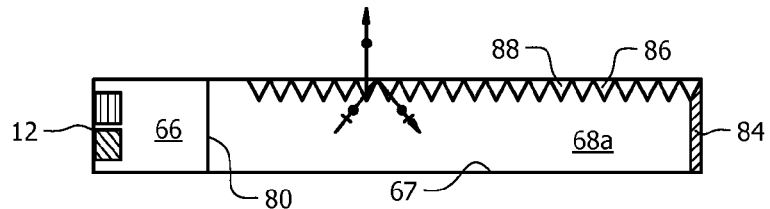
FIG. 13 is a diagrammatic side elevation view of an embodiment of said light mixing and illumination cavities where a birefringent material is applied to a micro-prism structure that overlies an exit window of the light illumination cavity.

FIG. 13 depicts a polarized light extracted solid illumination cavity 68a based on a birefringent micro-prism structure 86 formed in said solid illumination cavity 68a. The micro-optic collimation structure 80 and light extraction prism structure 82 of the previous embodiment are integrated into a molded solid illumination cavity module. Prism structure 86 is filled with birefringent material 88 having an ordinary refractive index matched to that of molded solid cavity 68a and an extraordinary refractive index higher than that of said solid cavity 68a with $\Delta n > 0.2$. Birefringent micro-prisms 86 extract S-polarization light within a specific design cone angle and P-polarization light is propagated inside solid illumination cavity 68a and is converted into S-polarization light and then finally extracted from said cavity. Quarter-wave plate 84 may be attached on one end of illumination cavity 68a to increase polarization conversion efficiency.

Figure 14A:
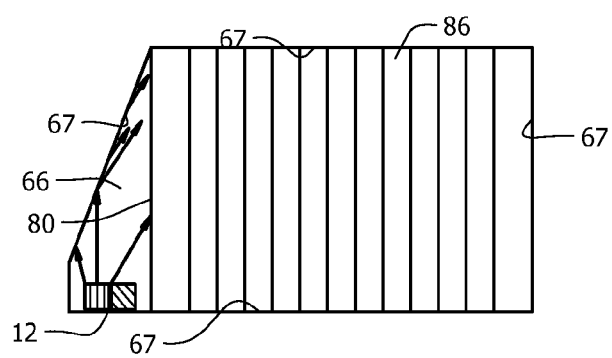
FIG. 14A is a diagrammatic top plan view of a side-mounted RGB LED light source.
Figure 14B:
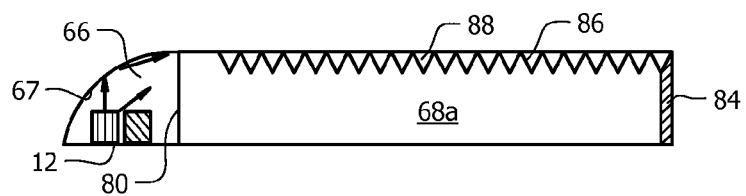
FIG. 14B is a diagrammatic side elevation view of a bottom-mounted RGB LED light source.

FIGS. 14A and 14B depict additional embodiments of RGB LED colors mixing and illumination cavity with RGB LED sets positioned on a vertical side wall of light mixing cavity 66 having an irregular shape as in FIG. 14A or on a bottom wall of light mixing cavity 66 having an arcuate top wall as in FIG. 14B. In both embodiments, light mixing cavity 66 folds the light which then enters light illumination cavity 68a for transmission to LCD panel 74. Light collimation plate 80 at the entry of light illumination cavity 68a is specially designed to reduce the LED light divergent angle.

Figure 15A:
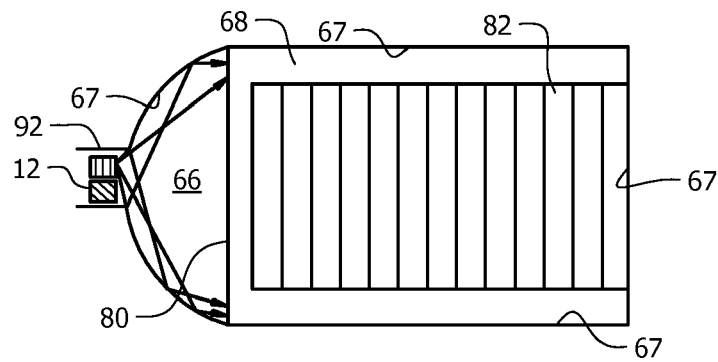
FIG. 15A diagrammatically depicts an alternative embodiment of the light mixing and light collimation cavities where the RGB LED light source is offset from the light mixing cavity.
Figure 15B:
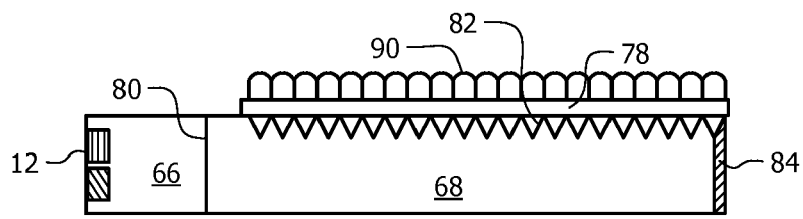
FIG. 15B diagrammatically depicts in side elevation an embodiment where a micro lens array is added to the exit surface of the light collimation cavity.

FIGS. 15A and 15B depict an embodiment of a compact RGB LED colors mixing and illumination cavity that is similar to the embodiments of FIGS. 11A and 11B. It includes two compact air cavities, 66 and 68, a light collimation Fresnel lens 80 positioned between light mixing cavity 66 and light illumination cavity 68, and a light extraction plate 82 to combine, homogenize, collimate and shape the RGB LED colors light. The light mixing and collimation cavity has a reflective step or neck 92 at its input window and collimation lens 80 at its output window for quick color mixing. Reflective step 92 at the input window angularly controls the light from off-set RGB LEDs 12 to achieve more symmetrical light distribution during LED color mixing in a short length. A high efficiency reflector cavity 66 and light collimation lens 80 at the output or front window of the cavity are used to collimate the mixed light that enters light illumination cavity 68. Light extraction plate 82 extracts collimated light from light illumination cavity 68. Light extraction window 82 could be smaller than the size of light illumination cavity 68 as depicted in FIGS. 15A and 15B to match up the micro display panel size. Light extraction plate 82 may be micro prism film with specific designed prism angle and shape to output light within a certain cone angle.

As depicted in FIG. 15B, light extraction plate 82 may also include a micro-lens array 90 for further collimating the light output from illumination cavity 68. Reflective polarization film 78 may be needed for polarization recycling. Quarter-wave plate 84 may be needed inside of illumination cavity 68 to quickly convert S-polarization into P-polarization for polarized light extraction after light hits reflective polarizer 78.

Figure 16:
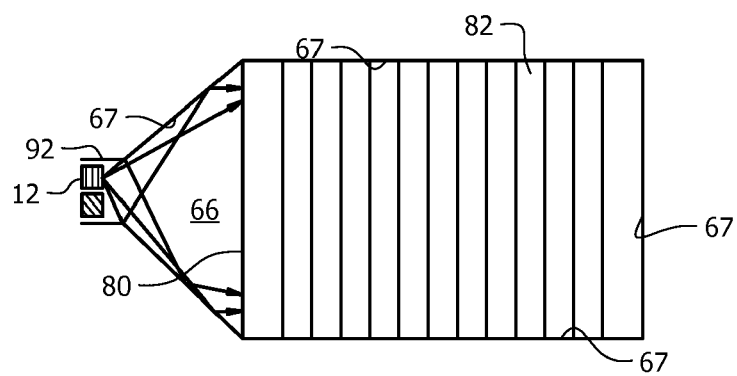
FIG. 16 diagrammatically depicts an alternative embodiment of the structure depicted in FIG. 15A.

FIG. 16 depicts an embodiment of the RGB LED colors mixing and illumination cavity that is similar to the FIG. 12 embodiment as modified by the embodiment of FIG. 15A. Light mixing cavity 66 is provided in the form of a hollow taper with a straight step or neck 92. The depth of step 92, light collimation Fresnel lens 80 and light extraction prism structure 82 is optimally designed to effectively mix and collimate the LED light in a very compact space to illuminate LCD panel 74.

Figure 17A:
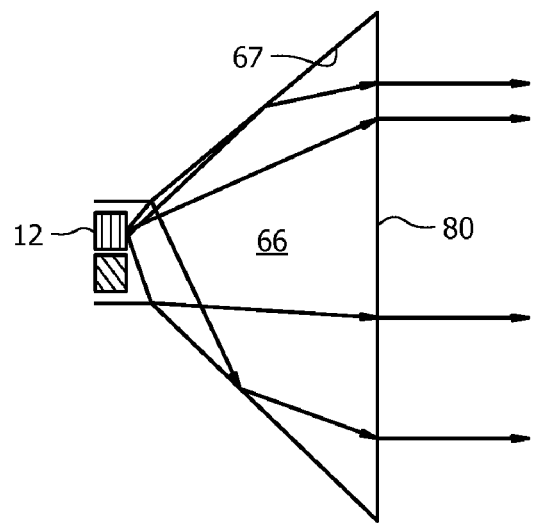
FIG. 17A diagrammatically depicts a light mixing cavity having a Fresnel lens for light collimation.
Figure 17B:
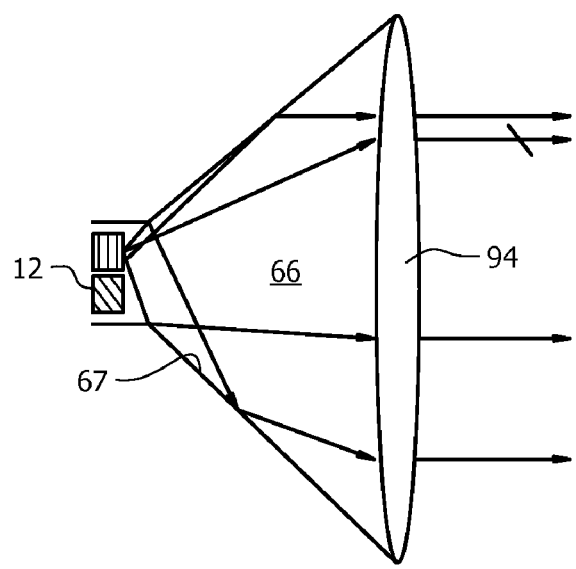
FIG. 17B diagrammatically depicts a light mixing cavity having a bulk lens for light collimation.

FIGS. 17A and 17B depict another embodiment of an LED light engine illumination module having light mixing cavity 66. Color mixing cavity 66 is in the form of a hollow or solid two-dimensional taper to change the LED light divergent angle. Straight step or neck 92 is formed at the input of the taper to angularly control the light from off-set RGB LEDs 12 to provide quick and uniformly mixed colors in a short taper length. Fresnel lens 80, as depicted in FIG. 17A, or a bulk lens 94 as depicted in FIG. 17B is used as the output window of the mixing cavity to further collimate the light. The output collimated light directly illuminates transmissive LCD 74 or a reflective LCOS panel.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A small, light-in-weight, mobile projector, comprising:
a source of light in the form of an RGB laser set;
an optical combiner having a thin profile disposed in light-receiving relation to said source of light;
a light illumination cavity having a thin profile disposed in light-receiving relation to said optical combiner;
said light illumination cavity having a front surface through which collimated light is emitted;
said optical combiner including at least two switchable liquid crystal layers disposed in light transmitting relation to one another;
a polymer dispersion liquid crystal grating disposed in overlying relation to a preselected layer of said at least two switchable liquid crystal layers;
said polymer dispersion liquid crystal grating providing phase modulation and de-speckling for light traveling therethrough;
a transmissive spatial light modulation panel having a thin profile being disposed in light-receiving relation to said light illumination cavity;
whereby light from said source of light is mixed by said optical combiner, collimated by said light illumination cavity, and illuminates said transmissive spatial light modulation panel in a thin space.

2. The projector of claim 1, further comprising magnifying optics disposed in parallel relation to said transmissive spatial light modulation panel;
whereby a 2-D projection is formed on a preselected surface disposed substantially parallel to said transmissive spatial light modulation panel.

3. The projector of claim 1, further comprising:
said light illumination cavity adapted to emit only light having an internal incident angle at said front surface of said light illumination cavity that is less than a total reflection critical angle inside said light illumination cavity.

4. The projector of claim 3, further comprising:
said plurality of switchable liquid crystal layers disposed in abutting relation to said source of light so that light emitted from said source of light is constrained to pass through said plurality of switchable liquid crystal layers.

5. The projector of claim 1, further comprising:
a light management film positioned between said light illumination cavity and said transmissive spatial light modulation panel, said light management film providing uniform light distribution along a vertical direction of said transmissive spatial light modulation panel.

6. The projector of claim 5, further comprising:
a beam diverging flat optic component for diverging said laser beam in two directions before entering said light illumination cavity;
said beam diverging flat optic component being a diverging diffuser so that said laser beam is diverged at a wide angle with uniform intensity distribution along the horizontal direction of said transmissive spatial light modulation panel;
a total internal reflection lens for collimating said laser beam at an entrance of said light illumination cavity before entering said light illumination cavity;
interior surfaces of said light illumination cavity being highly light-reflective to reflect light and avoid light leakage;
said laser beam being incident inside said light illumination cavity on a front exiting surface thereof at a predetermined angle;
a laser beam having an internal incident angle less than a total reflected critical angle being emitted from said front exiting surface to illuminate said transmissive spatial light modulation panel.

7. The projector of claim 6, further comprising:
a nano-wire grid polarizer sheet for transmitting a high ratio polarized beam and reflecting back a crossed polarization light for polarization recycling;
said polarization recycling including reflection of de-polarized light back to said light management film and said light illumination cavity for recycling.

8. The projector of claim 7, further comprising:
said light management film being be integrated into said nano wire-grid polarizer;
said nano wire-grid polarizer sheet having a nano-scale grating feature on a first side thereof for emitting a high ratio polarized beam and reflecting back de-polarized light for polarization recycling;
said nano wire-grid polarizer sheet having a prism feature on a second side thereof for turning light emitted by said light illumination cavity into collimated light with small cone angles.

9. The projector of claim 7, further comprising:
said nano wire-grid polarizer sheet being a multi-functional transmissive right angle-reflective polarizer film.

10. The projector of claim 7, further comprising:
a plurality of micro-grooves forming a predetermined pattern that is embedded into said front exit surface of said light illumination cavity, said micro-grooves having a predetermined shape;
a high refractive index material filling said micro-grooves to extract light;
said extracted light having an angular distribution controlled by said predetermined shape of said micro-grooves, a wedge angle and a difference of refractive index between the material of which said light illumination cavity is made and said groove-filling material;
said micro-groove pattern having a distribution density adapted to provide uniform light extraction.

11. The projector of claim 10, further comprising:
said microgrooves being filled with a birefringent material so that polarized light is extracted by said microgrooves.

12. A small, light-in-weight, mobile projector, comprising:
a source of light in the form of an RGB laser set;
an optical combiner having a thin profile disposed in light-receiving relation to said source of light;
said optical combiner including at least two switchable liquid crystal layers disposed in light transmitting relation to one another;
a polymer dispersion liquid crystal grating disposed in overlying relation to a preselected layer of said at least two switchable liquid crystal layers;
said polymer dispersion liquid crystal grating providing phase modulation and de-speckling for light traveling therethrough;
a transmissive spatial light modulation panel having a thin profile being disposed in light-receiving relation to said optical combiner;
whereby light from said source of light is mixed by said optical combiner, and illuminates said transmissive spatial light modulation panel in a thin space.

13. The projector of claim 12, further comprising magnifying optics disposed in parallel relation to said transmissive spatial light modulation panel;
whereby a projection is formed on a preselected surface disposed substantially parallel to said transmissive spatial light modulation panel.

* * * * *